United States Patent [19]

Morey et al.

[11] 3,979,152
[45] Sept. 7, 1976

[54] PARTICULATE MATERIAL HANDLING APPARATUS

[75] Inventors: Norval K. Morey, Winn; Leward N. Smith, Remus, both of Mich.

[73] Assignee: Morbark Industries, Inc., Winn, Mich.

[22] Filed: Nov. 22, 1974

[21] Appl. No.: 526,126

[52] U.S. Cl. ............................. 302/17; 137/344; 137/615; 302/34; 302/50; 302/60
[51] Int. Cl.² ........................................ B65G 53/52
[58] Field of Search .................. 302/17, 50, 59–61; 198/117–120, 125, 126, 233, 122; 137/344, 615

[56] References Cited
UNITED STATES PATENTS

| | | | |
|---|---|---|---|
| 1,617,490 | 2/1927 | Knox | 198/119 |
| 2,619,219 | 11/1952 | Carroll et al. | 198/122 |
| 3,367,725 | 2/1968 | Sanderson et al. | 302/61 |
| 3,460,869 | 8/1969 | Herr | 302/50 |
| 3,887,061 | 6/1975 | Hopkins | 198/118 |

Primary Examiner—Evon C. Blunk
Assistant Examiner—Jeffrey V. Nase

[57] ABSTRACT

Apparatus for handling particulate material, such as wood chips or the like in which a pneumatic conveying tube is manipulated to discharge a stream of wood chips or other particulate material toward a specific location as in the bulk loading of trucks or railway cars. An elongate rigid material conveying tube is coupled at one end to a receiving unit which includes a material receiving hopper and a penumatic blower for propelling material from the hopper into and through the tube. The opposite end of the tube is suspended from a mast assembly mounted upon a power-driven carriage which moves independently of the material receiving unit to position the discharge end of the tube at the desired location. A curved discharge section at the end of the tube may be rotated relative to the tube to direct the stream of discharged material to one side or the other of the tube. A normally closed cover plate on the curved discharge section may be opened and the normal discharge opening simultaneously closed to enable the material to be discharged in a stream directed substantially coaxially of the elongate tube.

5 Claims, 13 Drawing Figures

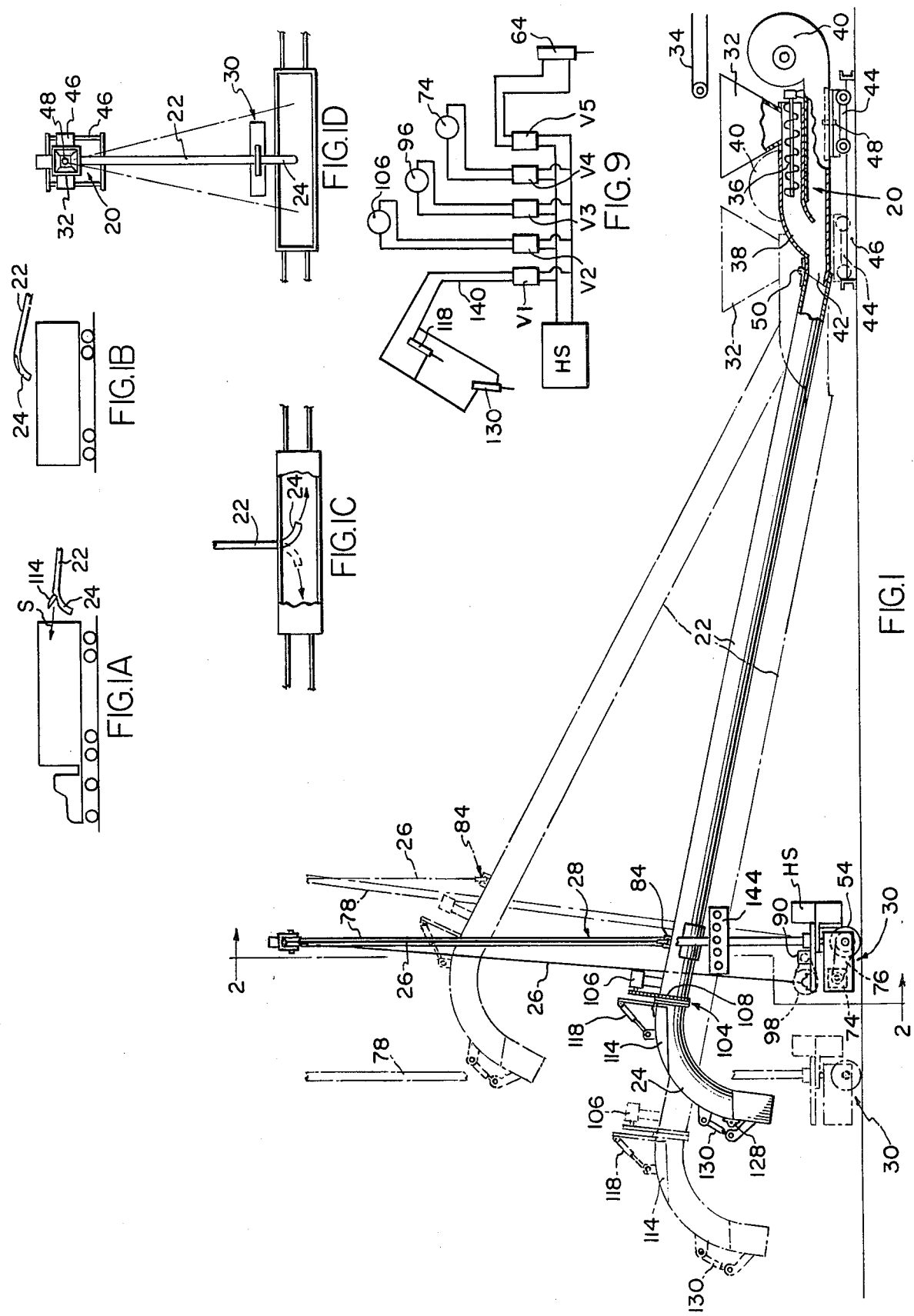

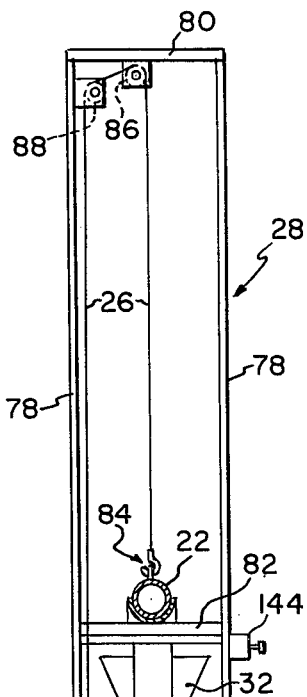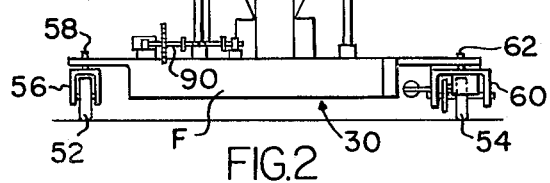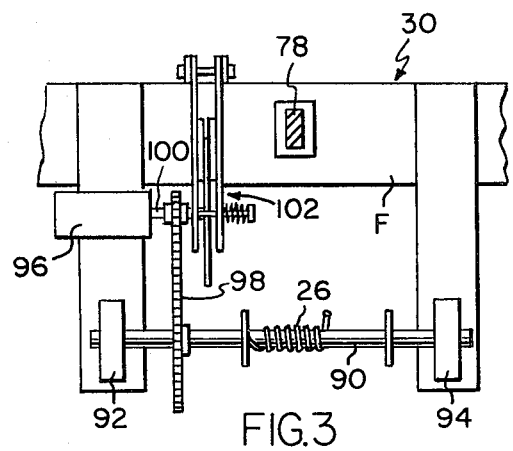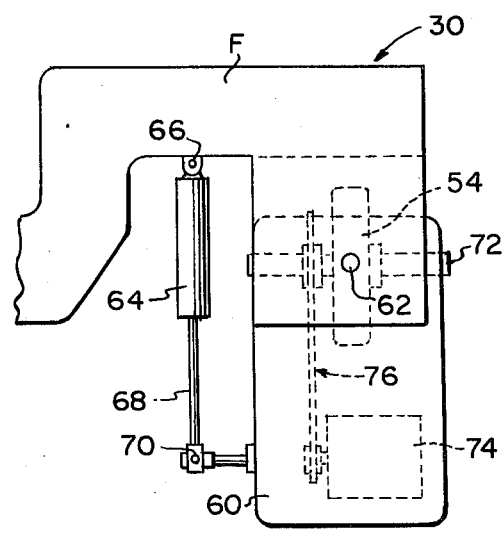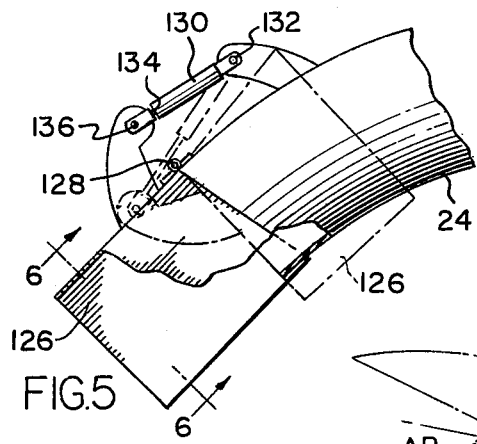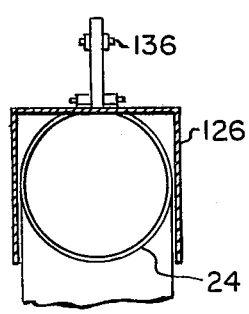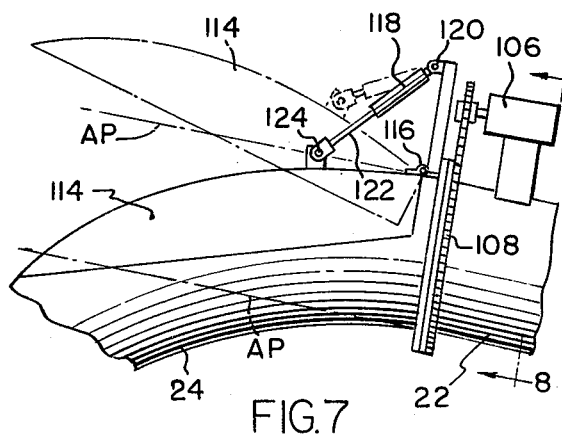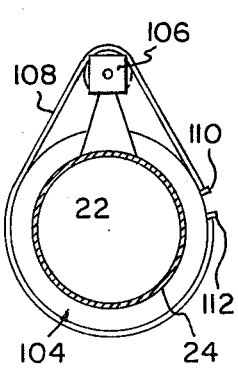

PARTICULATE MATERIAL HANDLING APPARATUS

SUMMARY OF THE INVENTION

While having utility in other applications, the present invention is especially designed to handle wood chips, particularly in the bulk loading of chips into truck beds or railway cars for transport. In this operation, a pneumatic blower is employed to propel the chips through an elongate tube whose discharge end must be movable so that the stream of chips discharged from the tube may be maneuvered to evenly and fully load the receiving vehicle.

The apparatus includes a receiving unit having a material receiving hopper and a pneumatic blower mounted upon a first carriage which is capable of a limited amount of movement. An elongate rigid material carrying tube is coupled at one end to the carriage and operation of the blower propels chips received in the hopper into and through the tube to be discharged in a stream from the opposite end of the tube. At the opposite end of the tube, a curved discharge section is rotatably mounted on the tube, and by rotation of the discharge section upon the tube, the stream of chips discharged can be directed at selected angles relative to the axis of the tube. A cover plate on the curved discharge section may be opened to discharge the stream in a path generally coaxial of the tube, a pivoted hood at the end of the curved discharge section being closed when the cover plate is open.

The discharge end of the tube is suspended by a cable from a mast assembly mounted upon a two-wheeled power driven steerable second carriage. The cable suspension enables the discharge end of the tube to be raised or lowered as desired, while the steerable mechanism on the second carriage enables the discharge end of the tube to be positioned laterally. The two-wheeled carriage is tiltable as a unit with the mast so that upon raising or lowering of the discharge tube while both carriages remain stationary, the mast and second carriage can tilt to compensate for the arcuate path of movement of the tube in pivoting about a horizontal pivotal connection of its inlet end to the receiving unit. The receiving unit in turn is mounted for pivotal movement about a vertical axis upon the first carriage so that lateral movement of the discharge end of the tube can take place.

Other objects and features of the invention will become apparent by reference to the following specification and to the drawings.

In the Drawings:

FIG. 1 is a side elevational view, with certain parts broken away, showing an apparatus embodying the present invention;

FIG. 1A, 1B, 1C, and 1D are diagrammatic illustrations of operational features of the apparatus;

FIG. 2 is a cross sectional view of the apparatus of FIG. 1 taken on the line 2—2 of FIG. 1;

FIG. 3 is a detail plan view of the cable drive structure;

FIG. 4 is a detail plan view of the steerable wheel of the mast carriage;

FIG. 5 is a detail side elevational view of the discharge end of the material conveying tube;

FIG. 6 is a cross sectional view taken on the line 6—6 of FIG. 5;

FIG. 7 is a detail side elevational view of the discharge section portion of the spout with alternate positions illustrated;

FIG. 8 is a cross sectional view taken on the line 8—8 of FIG. 7; and

FIG. 9 is schematic diagram of the hydraulic control circuit for the apparatus.

Referring first to FIG. 1, apparatus embodying the present invention includes a receiving unit designated generally 20 which is connected to one end of an elongate, rigid, particulate material carrying tube 22 whose opposite or discharge end, designated generally 24, is suspended by a cable 26 from a mast assembly, designated generally 28, mounted on a steerable power-driven carriage, designated generally 30.

Receiving unit 20 includes a receiving hopper 32 which receives wood chips or other particulate material to be handled from a source partially indicated at 34. A power-driven screw conveyor 36 is mounted underneath the hopper within a closed transfer chamber 38. Conveyor 36 conveys wood chips into the forward or left-hand end of chamber 38 as viewed in FIG. 1 and discharges the chips into the path of an airstream generated by a pneumatic blower 40. The stream of air generated by blower 40 discharges the chips from chamber 38 through a discharge outlet 42 into tube 22, the chips being propelled by the airstream through tube 22 and discharged in a stream from the discharge end 24 of tube 22.

Hopper 32, conveyor 36, chamber 38, and blower 40 are supported upon a carriage 44 which in turn is mounted for limited fore and aft movement along a relatively short track section 46. The hopper, chamber 38 and blower 40 are pivotally movable relative to carriage 44 about a vertical axis established by a vertical pivot pin 48. Tube 22 is connected to the discharge section 2 of chamber 38 for pivotal movement about a horizontal axis as at hinge connection 50 while maintaining a sealed communication with chamber 38.

Referring now to FIG. 1–4, carriage 30 includes a main frame F and an attached subframe SF which are supported upon two ground engaging wheels 52 and 54 (FIG. 2). Wheel 52 is rotatably carried on a strut 56 (FIG. 2) which in turn is connected to main frame F for free swivelling movement about a vertical axis as at 58.

Subframe SF includes a frame member 60 of generally channel-shaped cross section which is coupled to main frame F for pivotal movement about a vertical axis by a king pin assembly 62. Steering of carriage 30 is accomplished by a hydraulic cylinder assembly 64 pivotally mounted on main frame F (FIG. 4) as at 66 and having its piston rod 68 pivotally connected to frame member 60 as at 70. Wheel 54 is rotatably mounted on frame 60 by an axle 72 mounted in frame member 60. It is believed apparent from FIG. 4 that extension or retraction of piston rod 68 relative to its cylinder 70 will pivot frame member 60 relative to main frame F about the vertical axis established by king pin 62.

Powered movement of carriage 30 is accomplished by means of a reversible hydraulic motor 74 (FIGS. 2 and 4) which is coupled to drive wheel 54 in rotation via a chain and sprocket drive mechanism designated generally 76.

Mast assembly 28 is fixedly mounted on the main frame F of carriage 30 and includes a pair of vertical posts 78 fixedly secured at their lower ends to main frame F and rigidly interconnected to each other by upper and lower cross bars 80 and 82 (FIG. 2).

Cable 26 is connected to tube 22 by a hook and eye connection 84 (FIG. 2) and is led from tube 22 upwardly and around a pulley 86 rotatably mounted on upper cross bar 80 and then downwardly via a second pulley 88 to a winding drum or shaft 90 rotatably mounted on frame F as in bearing assemblies 92 and 94 (FIG. 3). A reversible hydraulic motor 96 mounted on main frame F is employed to drive shaft 90 in rotation via a drive train designated generally 98. The output shaft 100 of motor 96 is coupled to a constantly applied friction brake designated generally 102 which operates to hold shaft 90 against rotation when motor 96 is not driving. The discharge or left-hand end of tube 22 as viewed in FIG. 1 may be raised or lowered as desired by powered winding or unwinding of cable 26 from shaft 90.

Referring now particularly to FIGS. 1 and 5–8, it is seen that discharge end section 24 of tube 22 is smoothly curved through an angle of approximately 90° relative to the longitudinal axis of tube 22. Discharge end section 24 is rotatably coupled to tube 22 for rotation relative to tube 22 about the axis of tube 22 as by a rotative coupling assembly designated generally 104. A reversible hydraulic motor 106 mounted upon tube 22 is operatively connected to drive a chain 108 having its opposite ends fixedly coupled to end section 24 as at 110, 112 to rotatably position end section 24 relative to tube 22.

Wood chips are normally discharged from the apparatus after passage through the entire length of end section 24 and by rotatively positioning end section 24 upon tube 22, chips can be discharged to one or the other side of the axis of tube 22 as indicated in the diagram of FIG. 1C wherein loading of a railroad car having a side opening is illustrated. However, in some instances, such as the loading of chips into the open rear end of a covered trailer (FIG. 1A), it is more convenient to discharge the chips in a stream directed coaxially from tube 22. Structure for accommodating a coaxial discharge of a stream of chips is illustrated in FIG. 7.

As shown in FIG. 7, a curved cover plate 114 is formed by cutting a section from the convexly curved side of end section 24, the cut out end section constituting cover plate 114 being cut to enclose an axial projection of the interior of tube 22 indicated in broken lines at AP in FIG. 7. The cut out cover plate is hingedly reconnected to end section 24 as at 116 and a hydraulic cylinder 118 pivotally mounted on end section 24 as at 120 has its piston rod 122 pivotally coupled to cover plate 114 as at 124 so that actuation of cylinder 118 can selectively position cover plate 114 in the closed full line position of FIG. 7 or in the open position indicated in broken line in FIG. 7. When cover plate 114 is positioned in its open position, material propelled through tube 22 passes directly outwardly through the opening thus provided in a stream extending coaxially from tube 22. When cover plate 114 is in its closed position, the cover plate deflects the material coming from tube 22 and the material passes through the curved end section 24 to be discharged in a stream approximately perpendicular to the axis of tube 22.

A generally channel-shaped hood 126 is pivotally mounted at the discharge end of discharge section 4 as by a hinge assembly 128. (FIG. 5). A hydraulic cylinder 130 pivotally mounted on end section 24 as at 132 has its piston rod 134 pivotally coupled to hood 126 as at 136 and is employed to selectively position hood 126 in the normal position shown in full line in FIG. 5 or in a closed position shown in broken line in FIG. 5. Operation of cylinder 130 is coordinated with the operation of cylinder 118 so that hood 126 is positioned in its normal position when cover plate 114 is closed, and hood 126 is located in its closed position when cover plate 114 is open.

OPERATION

The various hydraulic cylinders and motors 64, 74, 96, 106, 118, and 130 are connected as shown in the diagram of FIG. 9 to a closed hydraulic pump system HS via suitable control valves V1–V5. Valves V1–V5 may take any of several forms of commercially available four-way reversing valves and, in the case of the rotary hydraulic motors 74, 96, and 106, the appropriate valves may incorporate a speed control if desired. Cylinder 118 and cylinder 130 are controlled from a single control valve V1, the connections as illustrated finding the rod end of cylinder 130 and the head end of cylinder 118 being commonly connected via a first line 140 to valve V1 with the second line 142 from reversing valve V1 being commonly connected to the rod end of cylinder 118 and the head end of cylinder 130. With this connection, retraction of the piston rod of one of the cylinders 118 and 130 is simultaneous with an extension of the piston rod of the other cylinder so that cover plate 114 is closed as hood 126 moves to its open position and vice versa. The various valves V1–V5 may be mounted on a control panel 144 (FIG. 1) shown as being located on the mast assembly.

Typical operations of the apparatus are diagrammatically shown in FIGS. 1A–1B. In FIG. 1A, the apparatus is disclosed with cover plate 114 in its open position so that a stream S of wood chips or other material is coaxially discharged from tube 22 inwardly through the rear door opening of a covered trailer.

In FIGS. 1B and 1D the apparatus is disclosed as discharging chips from the end of curved discharge section 24 downwardly into an open-top trailer or boxcar. As shown in FIG. 1D, carriage 30 can be positioned to shift the discharge end of tube 22 laterally to achieve an even and complete filling of the open-top vehicle, and this action can further be modified by rotatively adjusting discharge section 24, a procedure of convenience when filling a covered boxcar from a centrally located side door as illustrated in FIG. 1C.

As described above, and illustrated in various broken line showings in FIG. 1, the discharge end of tube 22 may be raised or lowered by operation of the cable winding motor 96 under the control of a reversing valve V3. When the discharge tube 22 is elevated and carriages 20 and 30 remain in their original positions, tube 22 is swung upwardly in an arc centered about the horizontal pivot connection 50 between the end of tube 22 and receiving unit 20. This arcuate movement results in a displacement of the hook and eye connection 84 to the right, because of the arcuate path followed, and the horizontal displacement required is accommodated by a tilting movement of mast assembly 28 as illustrated in FIG. 1. This tilting movement occurs about the axis of rotation of the ground engaging wheels 52 and 54 of carriage 30, the entire carriage tilting as a unit about the axis of its wheels.

Lateral movement of the discharge end of tube 22 relative to the receiving unit, as indicated in broken line in FIG. 1D, is accommodated by pivoting of chamber 38 upon carriage 44 about vertical pivot 48.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. Material handling apparatus for receiving particulate material, such as wood chips or the like, from a material source and discharging a stream of the particulate material toward a selected location, said apparatus comprising a first carriage mounted for limited movement along a first path, material receiving hopper means mounted upon said first carriage for pivotal movement relative to said first carriage about a vertical axis, an elongate rigid discharge tube operatively coupled at one end to said hopper means for pivotal movement relative to said hopper means about a horizontal axis, blower means on said hopper means for blowing particulate material from said hopper means through said discharge tube to discharge a stream of material from the other end of said discharge tube, a second carriage mounted for movement independently of said first carriage, a mast mounted on said second carriage and projecting upwardly therefrom, support means supporting the other end of said tube from said mast for free vertical and horizontal movement relative to said mast, power means for driving said second carriage in movement relative to said first carriage, and steering means for controlling the direction of movement of said second carriage.

2. Apparatus as defined in claim 1 wherein said support means comprises a winch means mounted on said second carriage and a cable extending from said winch means to the upper end of said mast and thence to a location on said tube adjacent said other end of said tube to freely suspend said other end of said tube from the upper end of said mast, said winch means being operable to raise or lower said other end of said tube relative to the top of said mast.

3. Apparatus as defined in claim 2 wherein said second carriage comprises a pair only of ground engaging wheels supporting said second carriage, said mast being rigidly fixed at its lower end to said second carriage and said second carriage being tiltable as a unit upon said pair of wheels.

4. Apparatus as defined in claim 1 wherein said steering means comprises a first ground engaging wheel on said second carriage, control means for steering said first wheel, and a second ground engaging wheel on said second carriage, said first and said second wheels constituting the entire support for said second carriage.

5. Material handling apparatus for receiving wood chips from a material source and discharging a stream of the wood chips toward a selected longitudinally displaced location, said apparatus comprising: a frame; a first carriage mounted for limited longitudinal movement along the frame, material receiving hopper and powered conveyor assembly means mounted upon said first carriage; said assembly means including a hopper arranged to feed chips to a powered conveyor having material moving flights; an elongate longitudinally extending discharge tube operatively coupled at one end to said conveyor for receiving chips therefrom; means mounting said tube for pivotal movement about both a vertical axis and a horizontal axis relative to said first carriage, blower means on said assembly means for blowing chips through said discharge tube to discharge a stream of material from the other end of said discharge tube, a movable chip director mounted on the end of said tube for directing the chips in different directions, a second carriage mounted for lateral horizontal movement independently of said first carriage, a mast mounted on said second carriage and projecting upwardly therefrom, support means supporting the other end of said tube from said mast for vertical and horizontal movement relative to said mast, and steerable wheel means provided to support said second carriage for steering movements about a vertical axis in a lateral direction relative to the first carriage and frame.

* * * * *